(12) United States Patent
Wang et al.

(10) Patent No.: US 8,204,853 B2
(45) Date of Patent: Jun. 19, 2012

(54) MAINTAINING CLIENT DATA INTEGRITY IN A DISTRIBUTED ENVIRONMENT USING ASYNCHRONOUS DATA SUBMISSION

(75) Inventors: Jin Wang, Kirkland, WA (US); Luming Wang, Bellevue, WA (US); Malik Hussain, Woodinville, WA (US); Zaiwei Du, Bellevue, WA (US); Zhenyu Tang, Sammamish, WA (US); Patrick J. Baumgartner, Kirkland, WA (US); Mark Xiaohong Yang, Sammamish, WA (US); Peter Eberhardy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 12/272,684

(22) Filed: Nov. 17, 2008

(65) Prior Publication Data

US 2010/0125549 A1    May 20, 2010

(51) Int. Cl.
*G06F 17/30*   (2006.01)
(52) U.S. Cl. ........................................ 707/610; 707/695
(58) Field of Classification Search .................. 707/610, 707/695
See application file for complete search history.

(56) References Cited

U.S. PATENT DOCUMENTS

| | | | | |
|---|---|---|---|---|
| 5,706,509 | A * | 1/1998 | Man-Hak Tso | 707/625 |
| 5,832,510 | A * | 11/1998 | Ito et al. | 711/100 |
| 5,940,827 | A | 8/1999 | Hapner et al. | |
| 6,122,629 | A | 9/2000 | Walker et al. | |
| 6,178,429 | B1 * | 1/2001 | Cherf | 707/690 |
| 6,647,474 | B2 | 11/2003 | Yanai et al. | |
| 6,950,834 | B2 * | 9/2005 | Huras et al. | 707/610 |
| 7,039,661 | B1 * | 5/2006 | Ranade | 707/610 |
| 7,065,540 | B2 * | 6/2006 | Chandrasekaran et al. | 707/674 |
| 7,120,747 | B2 | 10/2006 | Martin et al. | |
| 7,194,495 | B2 * | 3/2007 | Moir et al. | 707/610 |
| 7,308,542 | B1 | 12/2007 | Chicks et al. | |
| 7,383,289 | B2 | 6/2008 | Kraft | |
| 7,401,103 | B2 * | 7/2008 | Novik et al. | 707/610 |
| 7,788,237 | B2 * | 8/2010 | Voronov et al. | 707/695 |
| 2005/0181789 | A1 * | 8/2005 | Yach et al. | 455/433 |
| 2005/0234954 | A1 | 10/2005 | Bailey et al. | |
| 2008/0077656 | A1 | 3/2008 | Broda | |
| 2008/0189440 | A1 * | 8/2008 | Goyal et al. | 709/248 |

OTHER PUBLICATIONS

"Data Movement Patterns", accessible at <<http://msdn.microsoft.com/en-us/library/ms998449.aspx>>, last accessed Sep. 16, 2008, 8 pages, Version 1.0.0.
Seltzer, et al., "Journaling Versus Soft Updates: Asynchronous Metadata Protection in File Systems", Proceedings of the USENIX Technical Conference, Jun. 2000, 14 pages.

* cited by examiner

*Primary Examiner* — Kim Nguyen

(57) ABSTRACT

Data processing architecture where submitters can write data and/or metadata changes to a destination through an asynchronous interface. The architecture includes a ticketing system that issues a ticket (a unique identifier) to the submitter in response to receiving a changelist from the submitter. When the changes are successfully completed at the destination, the cached destination data can be re-downloaded to the submitter, and the changes cached in the submitter, discarded. Absent this capability, a user has to manually manage the cached changes and cached data. The architecture can be distributed in that multiple submitters can submit changelists. The destination provides data integrity by managing submissions to assist in ensuring data integrity across multiple submissions. Automatic changelist cleanup is provided on the submitter so that changelists do not impact performance, memory, and storage.

13 Claims, 7 Drawing Sheets

MAINTAINING CLIENT DATA INTEGRITY IN A DISTRIBUTED ENVIRONMENT USING ASYNCHRONOUS DATA SUBMISSION

BACKGROUND

The ubiquitous nature of computing system and devices demands that data exchanged between such systems be handled such that the user can be assured that the data is properly handled and persisted to the destination system. Systems exist where the user has to be involved with ensuring that data sent to a destination (e.g., peer, server) has been properly processed on the destination. For example, the user has to manually manage cached changes and cached data.

More specifically, in a client/server environment clients may not be able to deterministically delete a group of changes (a changelist) once the changelist has been submitted to the server for processing into a data cube. Additionally, the client may not know the status of a submitted changelist. Therefore, the client cannot reliably delete the changelist. If the client prematurely deletes the changelist or if the server rejects the submission, the submitted data will be lost. Moreover, undeleted changelists lead to wasted memory and mass storage on the client machine and impact performance.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a data processing system where submitters (e.g., clients, peers) can write data and/or metadata changes to a destination (e.g., server, a peer) through an asynchronous interface. When the changes are successfully completed at the destination, the cached destination data can be re-downloaded to the submitter, and the changes cached in the submitter, discarded. Absent this capability, a user has to manually manage the cached changes and cached data.

The architecture includes a ticketing system that issues a ticket (a unique identifier) to the submitter in response to receiving a changelist from the submitter. An asynchronous operation is provided that goes beyond the typical synchronous ticketing system by allowing the submitter to submit a changelist and resume normal data activity without having to wait to receive an update status of the submission at the destination.

Moreover, the architecture is distributed in that multiple submitters can submit changelists. The destination provides data integrity by managing submissions to assist in ensuring data integrity across multiple submissions. Automatic changelist cleanup is provided on the submitter so that changelists do not impact performance, memory, and storage. Once submitted, the submitter version of the changelist is locked, and after the destination updates the database with changelist data, the submitter changelist is deleted, and the user is notified.

The architecture can also be applicable in a peer-to-peer environment, where a changelist can be shared between peer clients. Changelist versions facilitate tracking data submission history, which is useful for auditing purposes to ensure corporate compliance.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
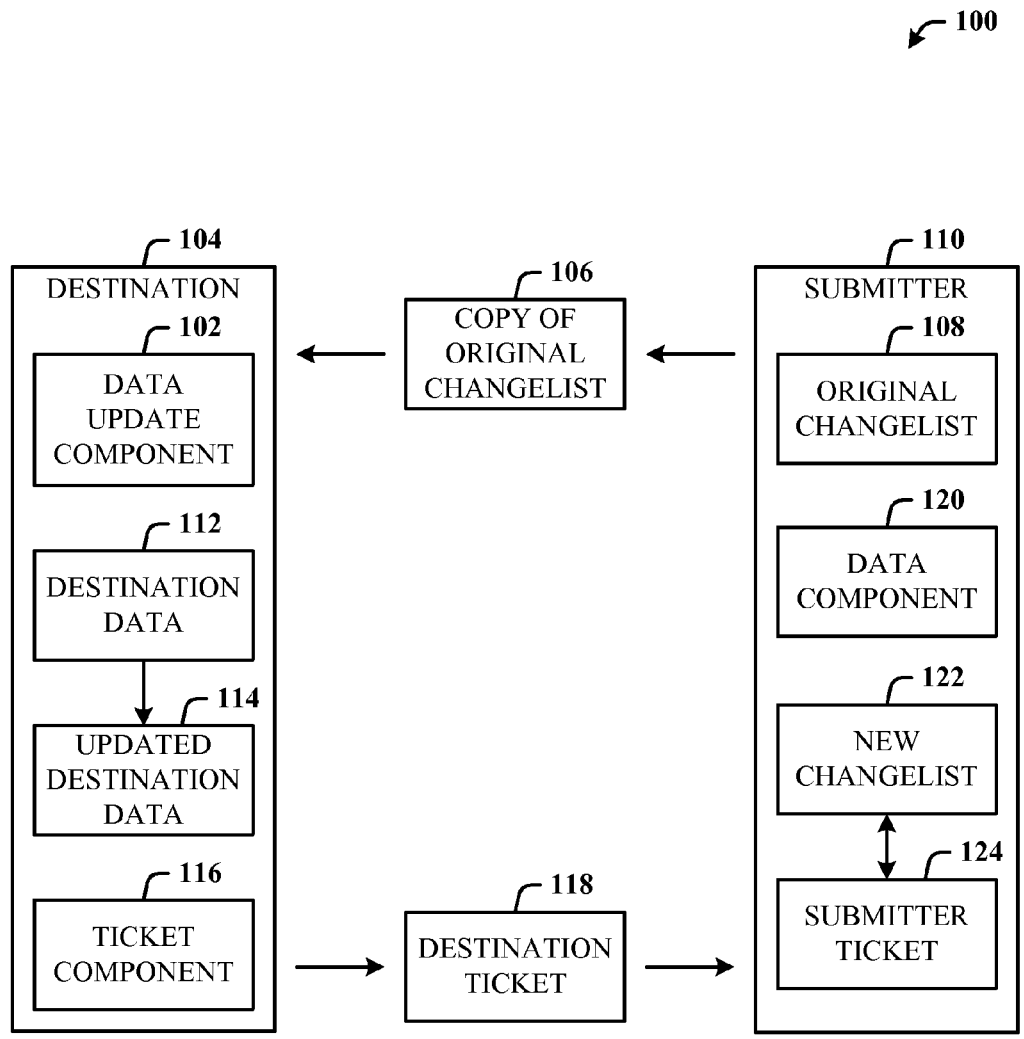
FIG. 1 illustrates a computer-implemented data processing system for a distributed environment in accordance with the disclosed architecture.

The disclosed architecture is an asynchronous ticketing solution that goes beyond the existing synchronous ticketing systems where a ticket is generated for a request and the request either passes or fails. In the disclosed architecture, a client can submit a changelist and move on without having to wait to determine the fate of the client submission at a server or a peer system. Multiple clients can submit changelists. Data Integrity is provided by a server managing submissions to assist in ensuring data integrity across multiple submissions. Automatic changelist cleanup is provided on the client such that changelists do not accumulate or get overly large. Once submitted, the changelist is locked. After the server updates the database with changelist data, the changelist is deleted and user is notified.

Extensibility is provided for extending the architecture thereby broadening utility for other areas related to performance management inside office systems using business intelligence. Peer-to-peer environments are supported in which the changelist can be shared between peer clients. Changelist versions are created and data submission history tracked, which can be useful for auditing purposes to help ensure corporate compliance.

In the disclosed submission ticketing system, after changes have been collected from a user and the changes have been submitted, the user is able to continue working while seeing the business model as if the submission has already been processed without having to stop and wait for the server to process the submission. This is because of the swapping and trimming of the changelist performed in the architecture.

In a more general description using a destination (e.g., a server, peer) and a submitter (e.g., a client, peer), data in memory of a destination is transmitted to a submitter where changes are made and accumulated as a group of changes called a changelist. The submitter then submits the changelist to the destination to update the destination data. The destination generates and assigns a destination ticket (or unique identifier) to the changelist and queues the changelist for updating the destination data in memory (e.g., cache). Additionally, the destination sends the ticket to the submitter, where receipt of the ticket locks the changelist at the submitter from accumulating any further changes. New changes at the submitter are then accumulated in a newly-created changelist.

The destination (server/authority) includes an interface for responding with the status of the changelist as being updated to data at the destination. After the changelist is updated to the data in the destination memory, the changelist status is complete. The cached data at the destination that has been updated with the submitter changelist changes is then downloaded to the submitter so that the submitter can then work from the updated data. When the submitter queries the destination using the ticket and update status is designated as incomplete, the submitter can merge any new changelist and with incomplete and unsubmitted changelists.

The server can be an authoritative source; thus, there does not have to be a single server/authority. Similarly, the client can be any number of clients and changelists can be shared in a peer-to-peer manner. Similarly, a node can be either a client or a server/authority. However, for purposes herein, the server is treated as an authority. Moreover, the architecture allows for one "in-flight" changelist (being synchronized at the destination) at a time, and can be extended to allow multiple "in-flight" changelists, as well.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented data processing system 100 for a distributed environment in accordance with the disclosed architecture. The system 100 includes a data update component 102 of a destination 104 for receiving a copy 106 of an original changelist 108 of data changes from a submitter 110 and updating the changes to destination data 112 of the destination 104 to create updated destination data 114.

A ticket component 116 of the destination 104 is employed for generating a destination ticket 118 related to the copy 106, and sending the destination ticket 118 to the submitter 110. A data component 120 of the submitter 110 manages the original changelist 108 based on status of the data update at the destination 104.

The submitter 110 can lock the original changelist 108 from storing further data changes based on receipt of the destination ticket 118. The submitter 110 creates a new changelist 122 that accumulates new changes after the original changelist 108 is locked. The submitter 110 creates and assigns a submitter ticket 124 to the new changelist 122.

The data component 120 merges the locked original changelist 108 with the new changelist 122 when the status of the data update at the destination 104 is incomplete or failed. The data component 120 unlocks the locked original changelist 108 when the new changelist 122 does not exist and the status of the data update at the destination 104 is failed, and the original changelist 108 functions as a new changelist by accumulating the new changes.

The submitter 110 downloads the updated destination data 114 and discards the original changelist 108 when the status of the data update at the destination 104 is successful. In one implementation, the submitter 110 is a client, the destination 104 is a server, and the original changelist 108 includes data and metadata. In an alternative implementation, the submitter 110 is a peer to the destination 104, and the original changelist 108 includes data/or and metadata.

In a typical implementation, the data update component 102 asynchronously receives and processes copies of original changelists received from multiple submitters.

Figure 2:
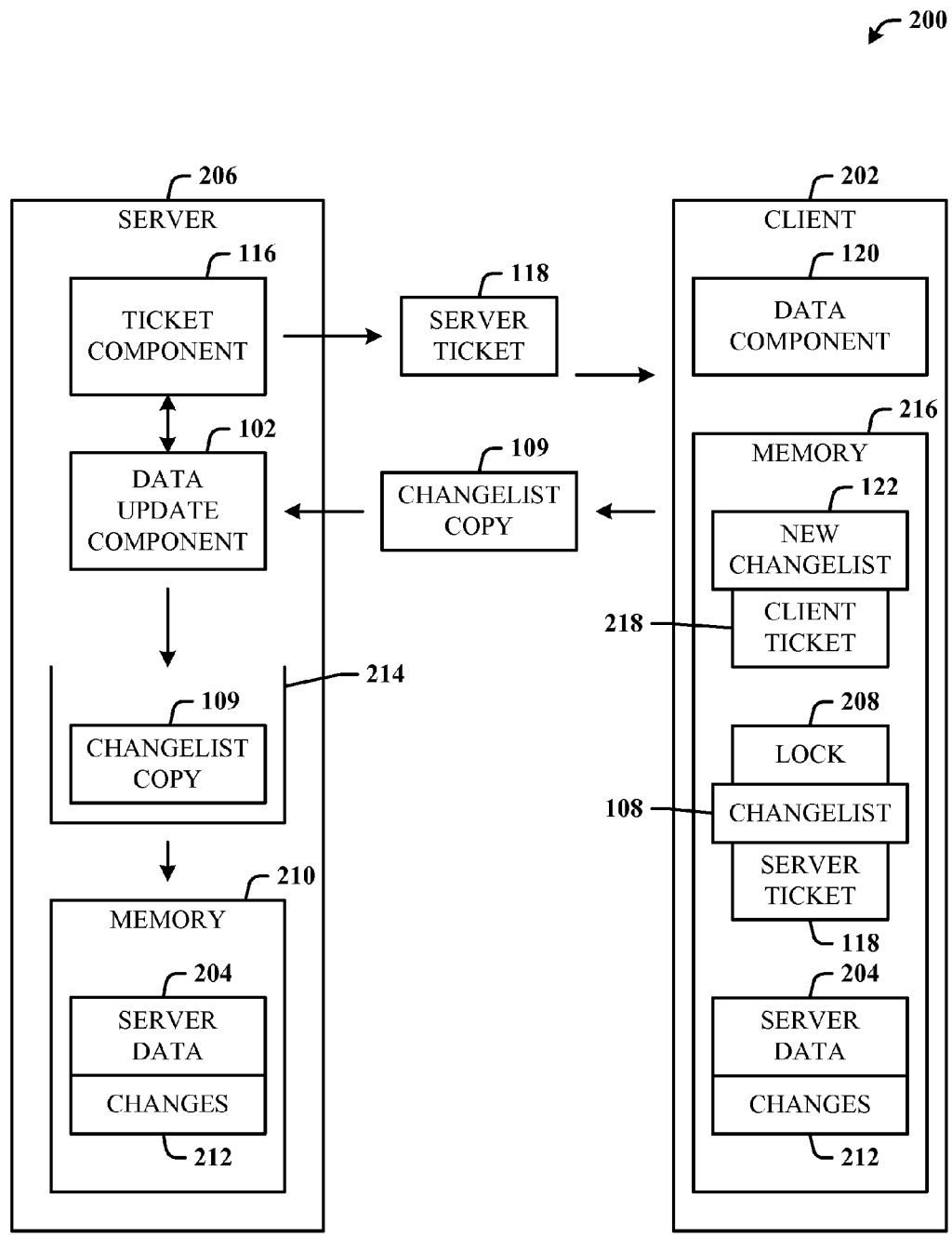
FIG. 2 illustrates an alternative representation of a data processing system in a distributed client/server environment in accordance with the disclosed architecture.

FIG. 2 illustrates an alternative representation of a data processing system 200 in a distributed client/server environment in accordance with the disclosed architecture. The system 200 shows that a client 202 operates on a project or task such as associated with a client application (e.g., spreadsheet, performance client application connecting to a network-based performance server), the client application generating data that is accumulated and grouped as the changelist 108 for updating server data 204 on a server 206 solely for the client application or for other client applications that share in the data update of data of the same application on the server 206.

The client 202 generates the changelist 108, and sends a copy 109 of the changelist 108 to the server 206. In response, the server 206 creates and assigns the server ticket 118 to the changelist 108. The ticket is sent back to the client 202 and included in the changelist 108, which operation applies a lock 208 to the changelist 108 to prevent further data change accumulation to the changelist 108 at the client 202. The client 202 can then use the ticket 118 to query the server 206 to determine if the server 206 has completed updating of the copy 109 of the changelist 108 to the server data 204 in a server memory 210 by applying changes 212 of the copy 109 to the server data 204.

The updating of the changelist changes 212 can be successful or a failure. This is addressed herein below. When the server 206 receives the copy 109 of the changelist 108, the copy 109 is enqueued in a server queue 214 for processing. In one implementation, only one changelist is updated to the server data 204 at a time. In an alternative embodiment, multiple changelists are received from correspondingly different clients, enqueued, and then sequentially updated to the server data 204 to ensure that the different clients are kept up-to-date and operating on the latest data. In yet another alternative embodiment, multiple changelists can be received from the same client, enqueued in the queue 214, and then sequentially updated to the server data 204 to ensure the user does not have to wait to determine the fate of submitted changelist before submitting more changelists.

Once the changes 212 of the copy 109 of the changelist 108 have been applied to the server data 204, the updated server data is pushed to the client 202 where the client 202 can then work off of the latest data. If, in the interim of the server 206 processing the copy 109 of the changelist 108, the client 202 creates new changes, these new changes are added to the newly created new changelist 122.

Once updated, represented as the server data 204 and the changes 212, the server data 204 and changes 212 are sent to the client 202 where the client 202 continues work on the updated server data. The locked changelist 108 is then discarded to provide more efficient use of client memory 216 and resources.

When the new changelist 122 is created on the client 202, the client 202 creates a client ticket 218 that is associated with and uniquely identifies the new changelist 122.

In other words, a computer-implemented data processing system 200 is provided that comprises the data update component 102 of the server 206 for receiving the copy 109 of an original client changelist 108 of data changes from a client 202 and updating the changes 212 to server data 204 to create updated server data (server data 204 and changes 212). The ticket component 116 of the server 206 generates and assigns the server ticket 118 to the copy 109, and sends the server ticket 118 to the client 202. The data component 120 of the client 202 manages the original changelist 108 based on status of the data update at the server 206.

The client 202 locks the original changelist 108 from storing further data changes based on receipt of the server ticket 118, creates the new changelist 122 that accumulates new changes after the original changelist 108 is locked, and assigns the client ticket 218 to the new changelist 122.

The data component 120 merges the locked original changelist 108 with the new changelist 122 when the status of the data update at the server 206 is failed. The data component 120 locks the original changelist 108 from storing further data changes based on receipt of the server ticket 118, unlocks the locked original changelist 108 when the new changelist 122 does not exist and the status of the data update at the server 206 is failed, and the original changelist 108 becomes the new changelist 122 that accumulates the new changes. The client 202 downloads the updated server data (server data 204 and changes 212) and discards the original changelist 108 when the status of the data update at the server 206 is successful.

Note that although illustrated as a single client and a single server, the system 200 can easily adapt to multiple clients and multiple servers. This is not limited to one server—one client or peer-to-peer environment. In a single server (data processing unit)—multiple client environment, a first client submits a changelist, and the other clients may download the changelist based on security or other settings. If a second client downloads the changelist, the changelist is downloaded as a locked changelist. If the submission succeeds, both clients receive the updated ticket and then delete the locked changelist. If the submission fails, the second client simply deletes the changelist (since the second client is not the owner of the changelist), while the first client needs to resubmit the changelist.

The submission ticketing system allows business users to seamlessly submit data while continuing to perform "what-if" requests on a business model and while maintaining an optimally small "changelist". The architecture enables the system to allow users to make changes to a business model, see the what-if effect of those changes, submit the changes, and then continue working. Without this, the performance of the system would be slower because the working changes would not be cleared or the user would have to wait until the submission is processed to continue working, if the user had cleared the changes immediately.

The architecture addresses at least a current problem of spreadsheet clients not being able to deterministically delete a changelist once the changelist has been submitted to the server for processing into the cube. The existing implementation does not allow a client to know the status of a submitted changelist. Therefore, the client cannot reliably delete the changelist. If the client does prematurely deletes the changelist at the client and the server rejects the changelist submission, the submitted data would be lost. Additionally, an undeleted changelist results in wasted memory actions (e.g., chip memory, mass storage) on the client machine, which can impact client performance.

The architecture implements a workflow ticketing (token) system between two computing entities such as a client and a server. This system enables the identification of a submitted changelist by creating and assigning (e.g., generated by the server) a server ticket ID to the changelist submitted to the server. Thus, the server ticket uniquely identifies the changelist between the client and the server, and uses the ticket during all client/server interactions about the particular changelist.

At server runtime of processing a client changelist, the server ticket is used between the client and the server to check the status of the submitted changelist, and changelist submission status.

The ticketing system can include two identifiers to identify a changelist: a server ticket ID and a client ticket ID. The server ticket ID is a unique indicia the server generates when the client submits the changelist. The server returns the server ticket ID to the client, which the client stores in the changelist. The client uses the server ticket ID to query the server about the changelist processing (data synchronization) status. The client ticket ID is a unique indicia the client generates when the client creates the changelist. The client uses the client ticket ID to uniquely identify the changelist that has not been submitted. For example, an imported changelist can have a client ticket ID but not a server ticket ID. Having a client ticket ID enables the identification of the imported changelist. The client ticket ID facilitates import and export of the changelist.

The server can limit update processing to one changelist to be enqueued for processing into the data cube. As soon as the changelist has been submitted, the client locks the client copy of the changelist thereby preventing further changes to it. A new changelist is then created to track any further changes.

A submitted changelist does not need to be re-submitted to server. The client can query the server to check whether the server has processed the changelist into the data cube. The server indicates completion of the data synchronization by returning a "finished" status in response to the client query. After the data cube has been updated, the client removes the changelist from its memory. Additionally, the server implements a mechanism that notifies the client whether a submission ticket ID will be generated.

Following is a description of example scenarios for operation of the disclosed architecture.

Scenario 1. A changelist is submitted to the server from a client. The change is shown as before and after by the submitter.

| Before submitter changes: | After submitter changes: | |
|---|---|---|
| Linens | Linens | 100 |

The processing steps can include the following. The client creates a changelist with a unique client ticket ID. The client submits a copy of the changelist to the server and the server returns a server ticket ID. The client updates the client changelist with the server ticket ID and locks the client changelist to prevent the entry of further changes to the client changelist.

Scenario 2. Respective changelists are submitted to the server from two clients, a home client and a work client of the same user.

On the home client, the submitter makes the following change to a Linens row in a spreadsheet application, saves the changelist to the home client, exits the spreadsheet application, and goes to work.

| Before submitter changes: | After submitter changes: |     |
| --- | --- | --- |
| Linens | Linens | 100 |

The processing steps can include the following. The client creates a home changelist having a unique home client ticket ID and stores the home changelist on the home client.

At work, the submitter makes the following change to the spreadsheet document (further changing the value of Linens in the spreadsheet) on the work client and submits the change to the server in the form of a work changelist.

| Before submitter changes: | After submitter changes: |     |
| --- | --- | --- |
| Linens | Linens | 200 |

The processing steps can include the following. The work client creates a work changelist with a unique work client ticket ID. Upon submission, the work client sends the work changelist to the server, and the server returns a server ticket ID. The work client updates the work changelist with the server ticket ID and locks the work changelist to prevent further changes via the work client.

Upon returning back home, the submitter opens the assignment. The submitted work changelist and home changelist are retrieved and both applied without prompting the user. The home changelist wins any conflicts when applying changelists.

| Before submitter changes: | | After submitter changes: | |
| --- | --- | --- | --- |
| Linens | 200 | Linens | 100 |
| 200 is from the work changelist submitted at work. | | 100 is from the client changelist. | |

The submitter then submits the above change to the server. The processing steps can include the following. The client creates a changelist with a unique client ticket ID. Upon submission, the client sends changelist to the server and the server returns a server ticket ID. The client updates the client changelist with the server ticket ID and locks the client changelist to prevent further changes.

Following is an example of a changelist created by defining a new type. The type includes the ticket IDs for the client and the server:

```
class ChangeList {
   Guid serverTicketId;
   Guid clientTicketId;
   Dictionary<MdxLocation,
ModifiedCell>mapMdxLocationToModifiedCell =
new Dictionary<MdxLocation, ModifiedCell>( );
   bool IsLocked {get { return (serverTicketId == Guid.Empty;
}}
}
```

When a new changelist is created, the client ticket ID is set to a non-zero value. The server ticket ID is not assigned until the changelist is submitted to the server for processing into the data cube. Not having the server ticket ID set indicates that the changelist is "unlocked" and changes can be made to the changelist. There is no need for an additional Boolean attribute (e.g., bool is Locked) since having an assigned server ticket ID serves that purpose. When creating a new changelist, formulas from the locked changelist are copied into the new changelist.

Following are examples of verification steps that can be taken: the client ticket ID is set on a new changelist and the server ticket ID is not set; the new changelist is created if there is a locked changelist; and, formulae are copied from the locked changelist to the new changelist.

When the changelist is submitted to the server for processing into the data cube, the server ticket ID is set. Additionally, the changelist is checked for whether it has already been submitted. If so, the changelist is not resubmitted. A submitted changelist can also be saved to the user's offline cache folder to avoid data loss (e.g., if the user exits the spreadsheet application, etc.). Note that regardless of the submission status, all changelists can be saved to the offline cache.

Following are examples of verification steps that can be taken for changelist submission: verify an already-submitted changelist is not resubmitted, and verify a submitted changelist is locked and no new changes can be added to it. A way to test this is that a clear changelist handler should not clear a submitted changelist.

With respect to deleting a changelist, the server calls to check whether the changelist has been processed into the data cube. If the submission has been successfully synchronized, the locked changelist is removed at the client and a message is presented to the user about the submission success. The client changelist is deleted by removing the client changelist from a changelist collection on a writeback container of the client. If the submission is a failure, the locked client changelist can be merged with the new client changelist. If the new changelist does not exist, the locked changelist can be unlocked and become the new changelist. A message can be presented to the user about submission failure.

Following are examples of verification steps that can be taken for changelist deletions: verify the changelist is deleted when server notifies that the changelist has been synchronized into the cube, and verify that the changelist that failed or had errors is merged into the new client changelist.

With respect to saving the changelist, a submitted changelist can be stored to a user's cache folder (e.g., OfflineCache). An existing method call can be used to save the changelist on the client. As previously indicated, regardless of the submission status, all changelists can be saved to the offline cache.

Following is a verification step that can be taken for changelist saving: verify that a submitted changelist is stored to a user's offline cache folder (e.g., OfflineCache).

The user can process "what-if" situations if desired using a what-if-query (WIQ). The WIQ is generated and takes into account multiple changelists. When generating the WIQ, changelists are looped and the WIQ is called for each changelist. For the WIQ, the order of the loop is that a locked (and hence, submitted) changelist is applied first, followed by the unlocked (new) changelist. This guarantees that new changes always win. A verification step for the WIQ can include verifying the WIQ is valid for submitted and active changelists.

Following is a description of the process when a client project is re-opened after submission. When the project is opened, if the server has the changelist for the project that was previously submitted, the following behavior can occur. The server-side changelist is downloaded. If there is a cached changelist, a comparison between the server-side changelist and the cached changelist is made. If the compare is the same, the server changelist is discarded. If the compare is different, the status of each is checked. By definition, one has already been processed successfully. The formulas from the successfully processed changelist are added to the active client changelist, and then the successfully processed changelist is discarded.

The status of the remaining changelist is checked. If the status is failed, the logic for a failed changelist is applied. If the status is successful, the logic for a succeeded changelist is applied. If the status is still pending, the changelist is cached locally in the client.

The client can check to see if a submission for an project (or task, etc.) has been successfully processed at the following times, for example: when the project (or task) is opened, when a refresh of system data in the project occurs, when a refresh of data in a spreadsheet or other application object occurs, and before a compare with the server occurs.

If the client finds that a submitted changelist has been successfully processed on the server, the client can take the following actions: clear the cached submitted changelist, and update the local cache for the project. With respect to the cache update, if models for the project have been cached locally, the model can be re-cached. This implies the project state will switch from local to online while the cubes are being re-cached. If the project has changed, the project is re-cached. If the user closed and re-opened the assignment prior to successful processing of the submission, the user can close and re-open the project to see the updated object.

Another action taken can be to notify the user that the submission was successful with the following message in a notification balloon: "The submission for <project name> was successful. Click here for more details." Clicking the balloon can open a project details dialog.

If the client finds that a submitted changelist failed to be processed on the server, the client can take the following actions: merge the cached changelist with the new changelist. If there is a conflict between the new changelist and the cached changelist the new changelist entry takes precedence. Other actions are that the merged changelist becomes the active changelist in the assignment, and the user is notified that the last submission failed with the following message in the notification balloon: "The submission for <project name> failed. Click here for more details." Clicking the balloon can open a project details dialog.

With respect to pivot table changelists, when a new changelist is created after submission, the changelist for any performance server enabled pivot table in the project can be synchronized with the table. After a submission failure, the merged changelist can be synchronized with the changelist for any performance server enabled pivot table in the project.

A clear changelist option can clear only the "active" changelist and not the cached changelist from a pending submission. A "view current changes" shows the changes in the "active" changelist and not the cached changelist from a pending submission. Both the cached and new changelist can be included in the basis for the compare with server feature. The check for successful processing can be run before the compare with server option.

Note, however, that the client-side ticket is not a requirement. An alternative implementation can use the server ticket only. However, the client-side ticket assists in managing the changelists on the client side. Yet another alternative is to use the client-side ticket only. However, this alternative implementation utilizes a client-side ticket that globally unique. The client-side ticket management then becomes more difficult when importing a changelist is supported.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
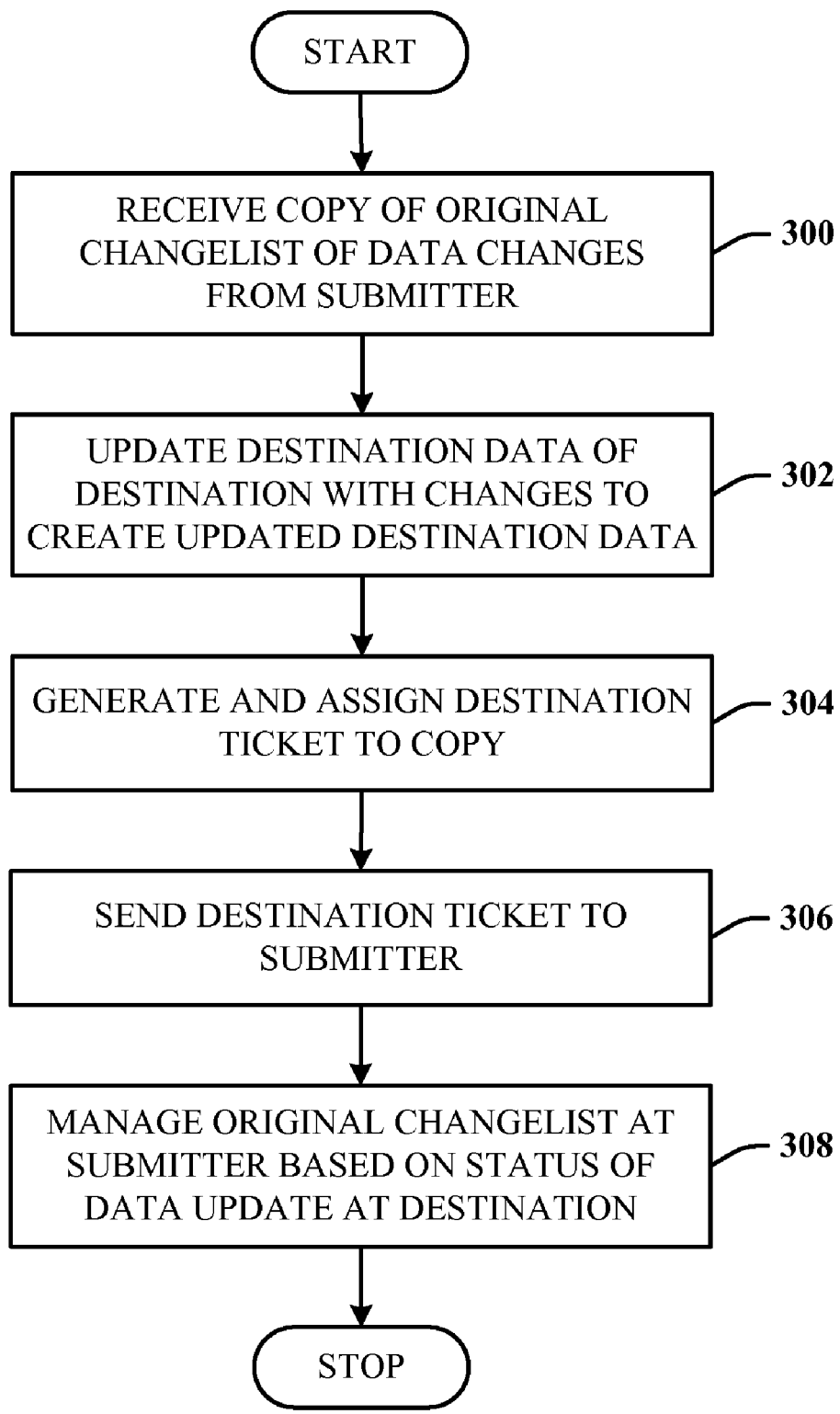
FIG. 3 illustrates a computer-implemented method of processing data.

FIG. 3 illustrates a computer-implemented method of processing data. At 300, a copy of an original changelist of data changes is received from a submitter. At 302, destination data of a destination is updated with the changes to create updated destination data. At 304, a destination ticket is generated and assigned to the copy. At 306, the destination ticket is sent to the submitter. At 308, the original changelist at the submitter is managed based on status of the data update at the destination.

Figure 4:
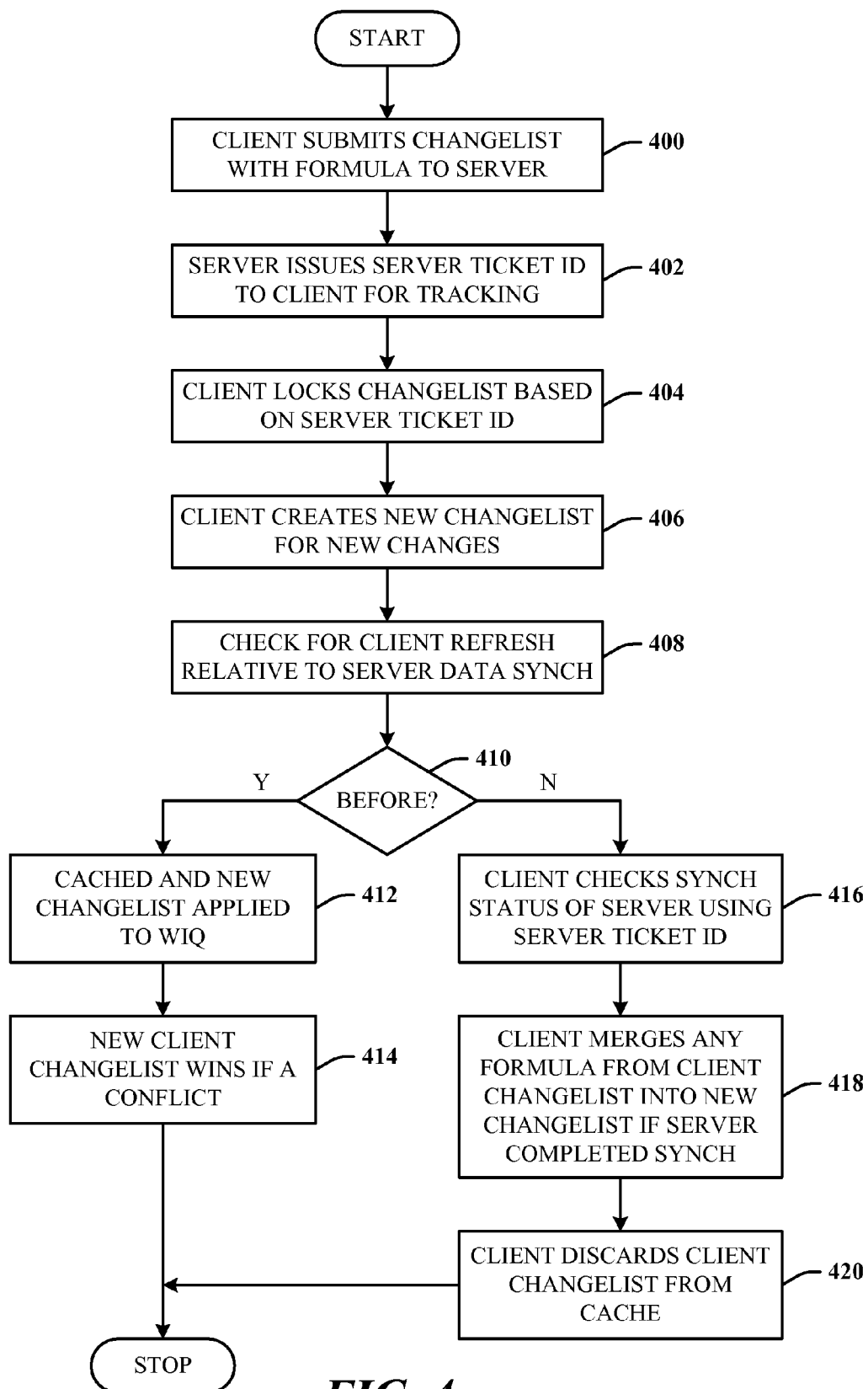
FIG. 4 illustrates a method of processing a submission successfully.

FIG. 4 illustrates a method of processing a submission successfully. At 400, a changelist with a formula is submitted to the server. At 402, the server receives the changelist and issues a server ticket ID to the client to track the server processing of the changelist. At 404, the client changelist is locked and cached in the client. At 406, a new client changelist is created to accumulate new changes. At 408, a check is made for a client refresh relative to server data synchronization of the changelist. Where the client refresh has been made before the server changelist has been processed, at 410, flow is then to 412 where both the cached and new client changelist are applied to a WIQ. At 414, the new client changelist wins in a conflict. Consider the case where the client refresh is made after the server has completed synchronization of the changelist. Flow is then from 410 to 416 where the client queries the server using the server ticket ID to check the status of the data synchronization. At 418, upon learning that the server has completed the synchronization, the client merges any formula from the client changelist into the new changelist. At 420, the client discards the client changelist from the client cache.

Figure 5:
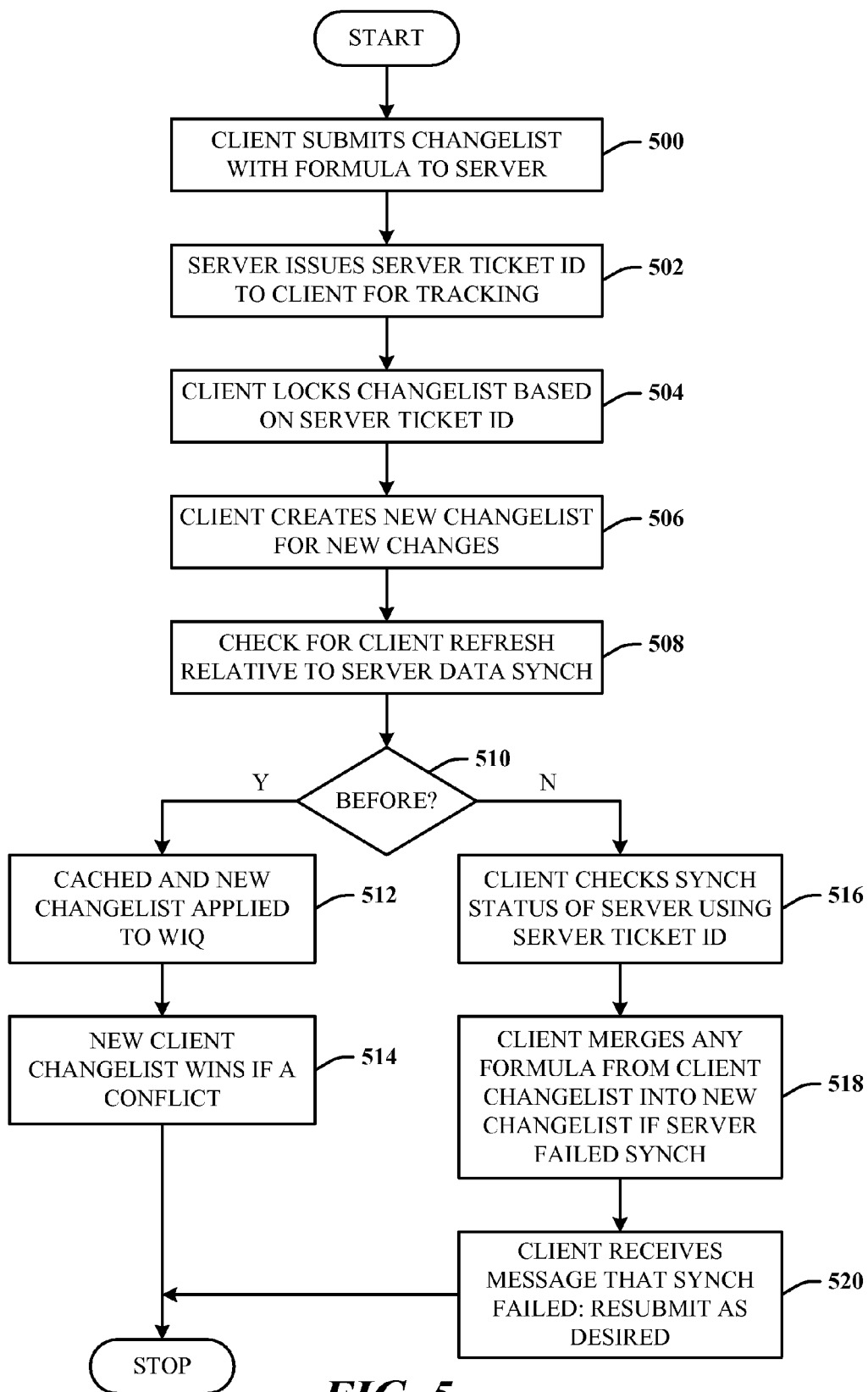
FIG. 5 illustrates a method of indicating submission failure.

FIG. 5 illustrates a method of indicating submission failure. At 500, a client changelist is submitted to the server. At 502, the server receives the changelist and issues a server ticket ID to the client to track the server processing of the submitted changelist. At 504, the client changelist is locked and cached in the client. At 506, a new client changelist is created to accumulate new changes. At 508, a check is made for a client refresh relative to server data synchronization of the changelist. Where the client refresh has been made before the server changelist has failed synchronization, at 510, flow is to 512 where both the cached and new client changelist are applied to a WIQ. At 514, the new client changelist wins in a conflict. Consider the case where the client refresh is made after the server has failed synchronization of the changelist. Flow is from 510 to 516 where the client queries the server using the server ticket ID to check the status of the data synchronization. At 518, upon learning that the server has failed the synchronization the client merges the client changelist and the new changelist. The new changelist wins between any conflicts of the changelists. At 520, the client receives a message that the prior submission failed and then resubmits the latest changelist as desired.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
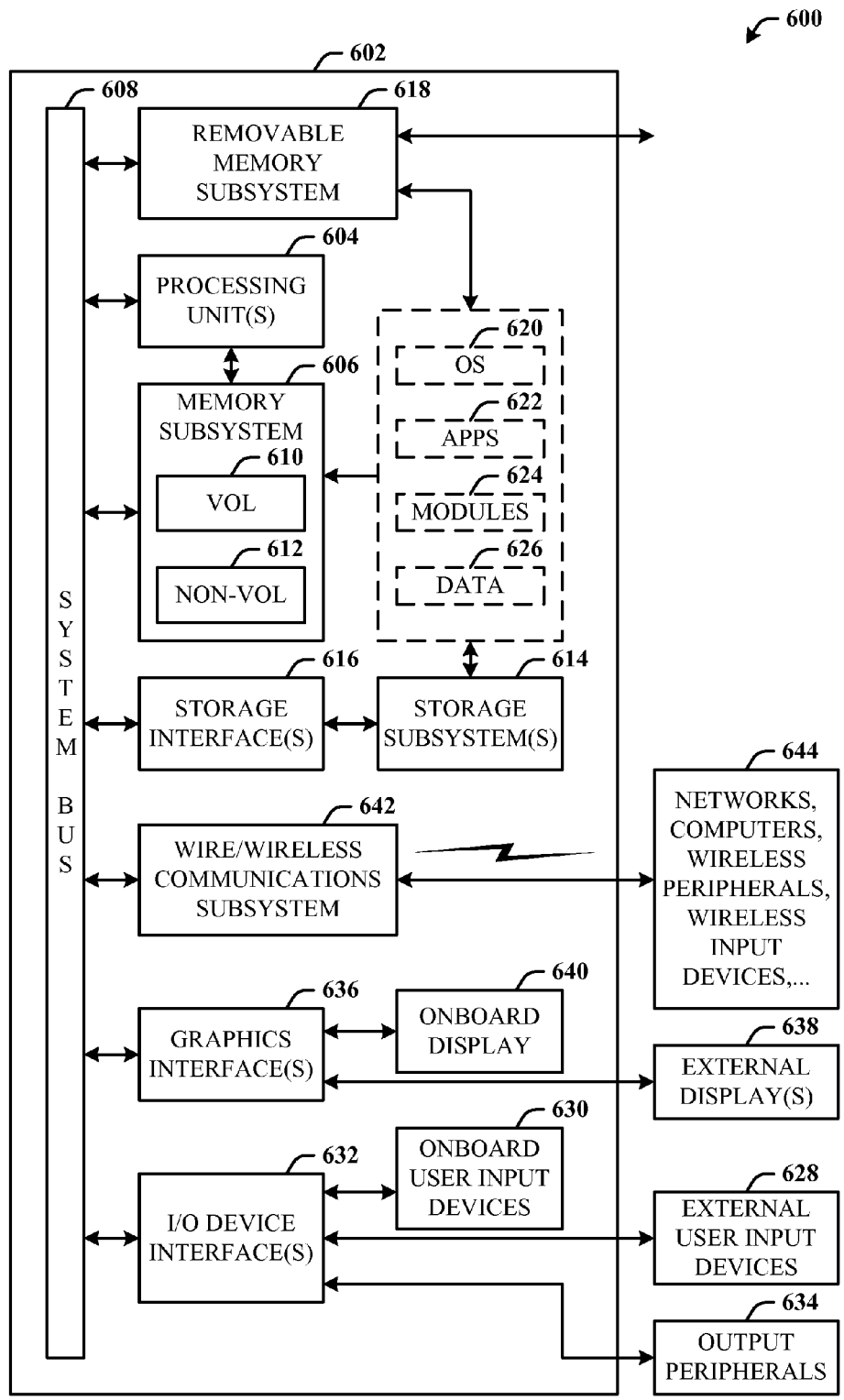
FIG. 6 illustrates a block diagram of a computing system operable to execute data processing in accordance with the disclosed architecture.

Referring now to FIG. 6, there is illustrated a block diagram of a computing system 600 operable to execute data processing in accordance with the disclosed architecture. In order to provide additional context for various aspects thereof, FIG. 6 and the following discussion are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having processing unit(s) 604, a system memory 606, and a system bus 608. The processing unit(s) 604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 606 can include volatile (VOL) memory 610 (e.g., random access memory (RAM)) and non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the memory subsystem 606 to the processing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes storage subsystem(s) 614 and storage interface(s) 616 for interfacing the storage subsystem(s) 614 to the system bus 608 and other desired computer components. The storage subsystem(s) 614 can include one or more of a hard disk drive (HDD), a magnetic floppy disk drive (FDD), and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a removable memory subsystem 618 (e.g., flash drive form factor technology), and/or the storage subsystem(s) 614, including an operating system 620, one or more application programs 622, other program modules 624, and program data 626. Generally, programs include routines, methods, data structures, other software components, etc., that perform particular tasks or implement particular abstract data types. The one or more application programs 622, other program modules 624, and program data 626 can include the submitter 110 of FIG. 1 and components thereof, the client 202 of FIG. 2 and thereof, where the computer 602 is a client machine. Where the computer is a server machine, one or more application programs 622, other program modules 624, and program data 626 can include the destination 104 and components thereof, copy 106 of the original changelist, destination ticket 118, the server 206 of FIG. 2 and components thereof, and the ticket 118, for example.

All or portions of the operating system 620, applications 622, modules 624, and/or data 626 can also be cached in memory such as the volatile memory 610, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so forth. Computer readable media can be any available media that can be accessed by the computer 602 and includes volatile and non-volatile media, removable and non-removable media. For the computer 602, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 602, programs, and data using external user input devices 628 such as a keyboard and a mouse. Other external user input devices 628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 602, programs, and data using onboard user input devices 630 such a touchpad, microphone, keyboard, etc., where the computer 602 is a portable computer, for example. These and other input devices are connected to the processing unit(s) 604 through input/output (I/O) device interface(s) 632 via the system bus 608, but can be connected by other interfaces such as a parallel port, IEEE 1394 serial port, a game port, a USB port, an IR interface, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP) using logical connections via a wire/wireless communications subsystem 642 to one or more networks and/or other computers. The other computers can include workstations, servers, routers, personal computers, microprocessor-based entertainment appliance, a peer device or other common network node, and typically include many or all of the elements described relative to the computer 602. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wire/wireless communication subsystem 642 (e.g., a network interface adapter, onboard transceiver subsystem, etc.) to communicate with wire/wireless networks, wire/wireless printers, wire/wireless input devices 644, and so on. The computer 602 can include a modem or has other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 7:
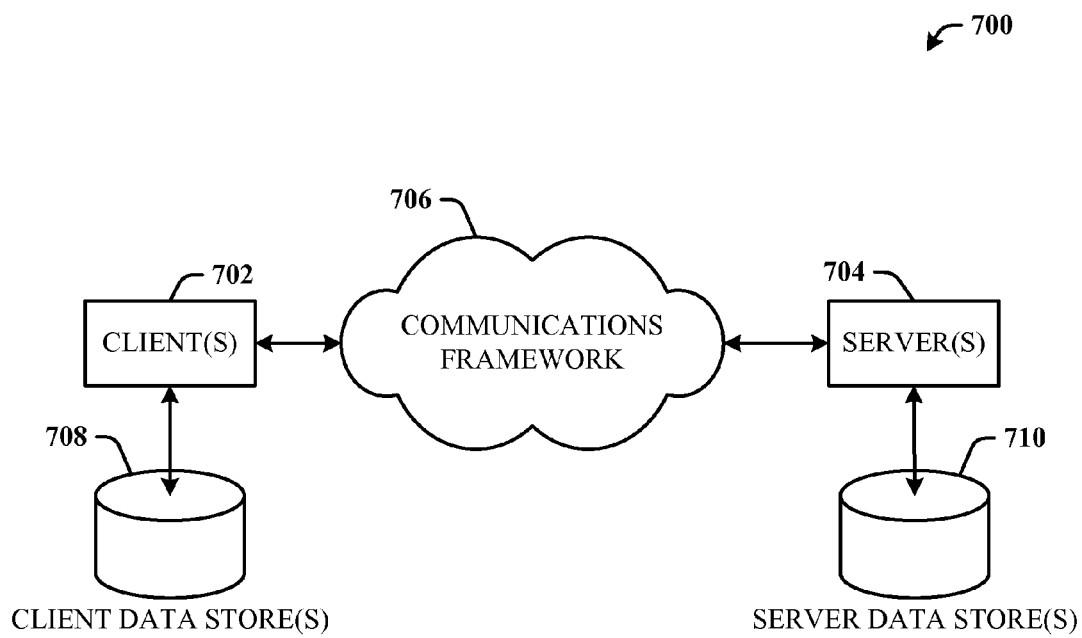
FIG. 7 illustrates a schematic block diagram of a computing environment that facilitates data processing in accordance with the disclosed architecture.

Referring now to FIG. 7, there is illustrated a schematic block diagram of a computing environment 700 that facilitates data processing in accordance with the disclosed architecture. The environment 700 includes one or more client(s) 702. The client(s) 702 can be hardware and/or software (e.g., threads, processes, computing devices). The client(s) 702 can house cookie(s) and/or associated contextual information, for example.

The environment 700 also includes one or more server(s) 704. The server(s) 704 can also be hardware and/or software (e.g., threads, processes, computing devices). The servers 704 can house threads to perform transformations by employing the architecture, for example. One possible communication between a client 702 and a server 704 can be in the form of a data packet adapted to be transmitted between two or more computer processes. The data packet may include a cookie and/or associated contextual information, for example. The environment 700 includes a communication framework 706 (e.g., a global communication network such as the Internet) that can be employed to facilitate communications between the client(s) 702 and the server(s) 704.

Communications can be facilitated via a wire (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the server(s) 704. The client(s) 702 can include the client 202 of FIG. 2, and the server(s) 704 can include the server 206 of FIG. 2, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data processing system, comprising:
    a data update component of a destination for receiving a copy of an original changelist of data changes from a submitter and updating the changes to destination data of the destination to create updated destination data;
    a ticket component of the destination for generating a destination ticket related to the copy, and sending the destination ticket to the submitter;
    a data component of the submitter for managing the original changelist based on a status of the data update at the destination, the submitter to lock the original changelist based on receipt of the destination ticket, the data component to merge the locked original changelist with a new changelist when the status of the data update at the destination is failed and the new changelist exists, wherein the data component unlocks the locked original changelist and the original changelist accumulates new changes, when the status of the data update at the destination is failed and the new changelist does not exist; and
    a processor implementing one or both of the data update component or the ticket component.

2. The system of claim 1, wherein the submitter creates the new changelist and the new changelist accumulates new changes after the original changelist is locked.

3. The system of claim 2, wherein the submitter creates and assigns a submitter ticket to the new changelist.

4. The system of claim 1, wherein the submitter downloads the updated destination data and discards the original changelist when the status of the data update at the destination is successful.

5. The system of claim 1, wherein the submitter is a client, the destination is a server, and the original changelist includes data and metadata.

6. The system of claim 1, wherein the submitter is a peer to the destination and, the original changelist includes data and metadata.

7. The system of claim 1, wherein the data update component asynchronously receives and processes copies of original changelists received from multiple submitters.

8. A computer-implemented data processing system, comprising:
- a data update component of a server for receiving a copy of an original changelist of data changes from a client and updating the changes to server data to create updated server data;
- a ticket component of the server for generating and assigning a server ticket to the copy, and sending the server ticket to the client;
- a data component of the client for managing the original changelist based on a status of the data update at the server, the client to lock the original changelist based on receipt of the server ticket, the data component to merge the locked original changelist with a new changelist when the status of the data update at the server is failed and the new changelist exists, wherein the data component unlocks the locked original changelist and the original changelist accumulates new changes, when the status of the data update at the server is failed and the new changelist does not exist; and
- a processor implementing one or both of the data update component or the ticket component.

9. The system of claim 8, wherein the client creates the new changelist and the new changelist accumulates new changes after the original changelist is locked, and the client assigns a client ticket to the new changelist.

10. The system of claim 8, wherein the client downloads the updated server data, discards the original changelist when the status of the data update at the server is successful, and sends a notification that the changelist was successfully submitted.

11. A computer-implemented method of processing data, comprising:
- receiving a copy of an original changelist of data changes from a submitter;
- updating destination data of a destination with the changes to create updated destination data;
- generating and assigning a destination ticket to the copy;
- sending the destination ticket to the submitter;
- managing the original changelist at the submitter based on a status of the data update at the destination, the submitter to lock the original changelist based on receipt of the destination ticket, the data component to merge the locked original changelist with a new changelist when the status of the data update at the destination is failed and the new changelist exists; and
- unlocking the locked original changelist and accumulating new changes in the original changelist, when the status of the data update is failed and the new changelist does not exist.

12. The method of claim 11, further comprising:
- creating the new changelist after the original changelist is locked, the new changelist to accumulate new changes; and
- assigning a submitter ticket to the new changelist.

13. The method of claim 11, further comprising:
- downloading the updated destination data; and,
- discarding the original changelist when the status of the data update is successful.

* * * * *